United States Patent [19]

Morgan

[11] 3,761,999

[45] Oct. 2, 1973

[54] CABLE STRAP WITH MULTIPLE TOOTH PAWL

[75] Inventor: Thomas Edward Morgan, Cleveland Heights, Ohio

[73] Assignee: International Telephone and Telegraph Corporation, New York, N.Y.

[22] Filed: Dec. 20, 1971

[21] Appl. No.: 209,921

[52] U.S. Cl. .............................................. 24/16 PB
[51] Int. Cl. ............................................ B65d 63/00
[58] Field of Search ........... 24/16 PB, 17 A, 30.5 P, 24/73 PB, 206 A, 208 A; 248/73, 74 PB

[56] References Cited
UNITED STATES PATENTS

| | | | |
|---|---|---|---|
| 3,009,220 | 11/1961 | Fein | 24/16 PB |
| 3,127,648 | 4/1964 | Emery | 24/16 PB |
| 3,368,247 | 2/1968 | Orban | 24/16 PB |
| 3,588,962 | 6/1971 | Feldberg | 24/16 PB |
| 3,660,869 | 5/1972 | Caveney et al. | 24/16 PB |

*Primary Examiner*—Donald A. Griffin
*Attorney*—C. Cornell Remsen, Jr. et al.

[57] ABSTRACT

The cable strap or tie disclosed has an elongated, unitary, flexible plastic strap body with an enlarged head at one end. A transverse opening in the head allows the strap body or tongue to be threaded through the opening in the head to clamp a bundle of wires or the like within the loop so formed. At the head end the tongue terminates in an integral flexible pawl disposed in the passage through the head opening. The pawl has adjacent to its free end a plurality of stub end ratchet teeth positioned to mate with the strap body when the tongue of the cable strap is threaded through the head. The pawl has a tapered body leading to the tooth alignment. The alignment of teeth may include two, three or four teeth, the most remote tooth terminating a distance below the plane of the top of the head by at least one tooth spacing.

5 Claims, 5 Drawing Figures

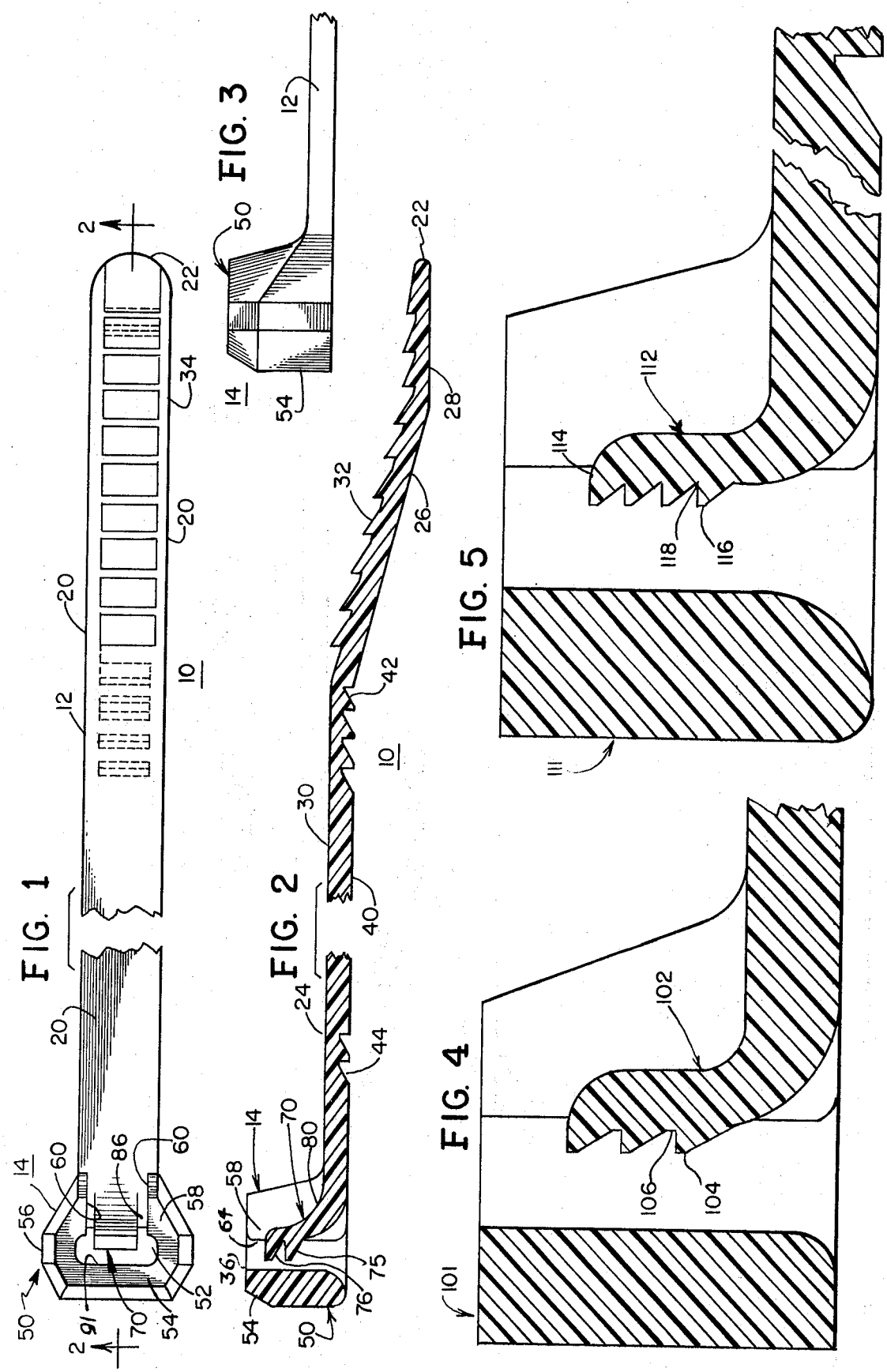

CABLE STRAP WITH MULTIPLE TOOTH PAWL

BACKGROUND OF THE INVENTION

The invention relates to a cable strap (sometimes called a bundle tie) adapted to be fabricated as an integral one-piece structure.

The prior art is replete with many forms of cables embodying many variations in component shape and size. Some employ integral one-piece construction including a pawl extending into the head opening, while others use metal pawls embedded in the strap and protruding into the opening. Many variations in the shape of the pawl have been used as the basis for patents, either alone or in combination with the shape of ratchet teeth on the body or tongue of the strap. For example, in my U.S. Pat. No. 3,672,003 issued June 27, 1972, I show a strap of generally similar construction having a single tooth at the pawl end.

The ideal cable strap would be a low cost strap capable of being fabricated by mass production techniques and which reliably and tightly clamps and holds a wire or group of wires within the strap loop in a manner allowing ready assembly of the tie and one which can withstand bending forces and shear forces.

To approach this ideal, the present invention utilizes a unitary construction with a pawl inherently molded to the end of the tongue or body within the head; the pawl is relatively flexible and its joinder to the strap body is arcuate. The pawl body is substantially normal to the tongue body and terminates in either two, three or four spaced ratchet pawl teeth, the outermost end of the upper tooth forming the pawl tip. The teeth mate with similarly shaped ratchet teeth formed in the strap body when the strap body has passed through a passage in the head. The strap is held firmly and tightly by this mating, with the side risers of the passage binding the strap to the pawl thereby locking the cable bundle within the strap loop. The strap head is essentially a U-shaped member integrally connected to the strap body, with the base of the U-shape confronting the pawl, and with the pawl extending into the U opening beyond the partial riser walls of the head. The strap may have its outer sidewalls beveled to approximate a hexagonal form.

SUMMARY OF THE INVENTION

My pawl is arcuate, thinner than the thickness of the strap, and tapers from a maximum thickness where it joins the teeth to a minimum thickness immediately adjacent to the first pawl tooth. Most other multiple tooth pawls are thicker than the strap thickness and have a narrowed cross section acting as a hinge or pivot at the base of the pawl. My pawl flexes throughout its length and, therefore, does not have excessively high stress concentrations in any one specific area as the other pawls frequently have at their pivot section. It is well known in the art that a tapered cantilever beam such as my pawl is a more or less "constant strength" cantilever beam, there being no one area of weakness where breakage is more apt to occur. The curved shape of my pawl allows a gradual transition from the strap to the pawl teeth which again keeps stress concentrations to a minimum. Most other pawl designs are attached to a wall rather than directly to the strap. Most other designs have a notch between the pawl and the wall. It is well known in the art that a notch causes a very high stress concentration, which my design avoids.

My design employs a plurality of ratchet teeth. In the course of developing a single-tooth pawl, I found that for small cable straps a single tooth was not strong enough. The single tooth tended to abrade due to its engaging teeth on the strap and thereby causing the pawl to deform and allow the strap to slip. By adding at least one additional tooth, this deformation of the teeth is essentially prevented. Also, when ratcheting a long strap past the pawl, the lower most tooth absorbs substantially all the wear and abrasion. The other tooth or teeth are pivoted away from engagement with the strap during its passage through the pawl opening in the forward direction leaving the top tooth or teeth unabraded, which is important since the top tooth or teeth support most of the load. A single tooth would naturally wear down when ratcheting a long strap past it and might not be capable of supporting the full normal load. By the addition of further teeth, these teeth will engage and hold the strap teeth against release.

It is therefore the major object of my invention to provide a new and improved one-piece cable strap.

It is a still further object of my invention to provide a new one-piece cable strap with integrally formed, multiple tooth, flexible pawl of novel configuration.

It is a still further object of my invention to provide a cable strap with a new and improved head design.

Other objects, features and advantages of the invention will become more apparent from the following specification and claims taken in conjunction with the drawings, the description of which follows.

BRIEF DESCRIPTION OF THE DRAWINGS

FIG. 1 is a plan view in elevation of a preferred embodiment of a cable strap employing my invention;

FIG. 2 is a sectional view of the strap of FIG. 1, taken along line 2—2 of FIG. 1;

FIG. 3 is a side view in elevation of the head end of the cable strap;

FIG. 4 is an enlarged sectional view of a head and pawl where the pawl has three teeth, and;

FIG. 5 is a view similar to FIG. 4 of a further embodiment of my invention having four teeth.

DETAILED DESCRIPTION OF PREFERRED EMBODIMENT

The cable tie or strap 10 shown in the drawings may be provided in a number of lengths and widths, however, the comparative shapes and relationship of the component parts thereof are generally maintained. Strap 10 includes a main body 12 and an enlarged head 14 connected at one end thereof. The cable tie including both body and head preferably is molded as a unitary member of material such as nylon or suitable flexible but somewhat rigid plastic material such as polypropylene. The main body 12 is of generally rectangular or oblong cross section with parallel sides 20 terminating at its free end in a tongue 22 which may be arcuate as shown, or tapered as desired.

The body 12 as shown in FIG. 2 may be comparatively flat for a portion 24 of its length nearest head 14. From this flat portion 24, the body 12 is sloped within a ramp portion 26 which terminates in an offset or stepped portion 28 adjacent tongue end 22. This offset makes it easier to push the strap 10 under a bundle of wires while considerably lessening the risk of the strap being caught within the bundle itself.

The top surface 30 of body 12 (as best seen in FIGS. 1 and 2) has a series of serrations 32 which in the form shown extend throughout the offset portion 28. If desired, the extent of the serrations 32 may continue for some of the ramp portion 26. One purpose of the serrations is to allow the offset portion 28 to be grasped manually for looping or threading of the tongue end through the head. The serrations are bounded by the strap edges 34 at each side 20 of the main body 12, and the roots of the serrations substantially coplanar with the surface 30 and rails 34. These serrations also serve as a temporary means of holding a strap to a bundle of wires prior to tightening, by engaging the inside top edge 36 of head 14. When this edge is engaged, the strap will not straighten out and will not fall off the bundle, however, the strap can easily be removed by the application of a slight force.

As best seen in FIG. 2, the body under-surface 40 has ratchet teeth indicated by reference characters 42 and 44 incised into the surface for the longitudinal extent of which may be varied from strap to strap, as desired. Once the strap has been pulled taut through head 14, the main strap teeth 42 and 44 are fully engages by the pawl, the strap cannot be removed except by cutting, or prying the pawl open with a sharp object such as the tip of a knife blade.

The enlarged head 14 includes a U-shaped main framing member 50 arched about and defining an oblong aperture 52 which extends entirely through the body of the cable strap. The framing member 50 has an end wall 54 normal to the main body 12, the end wall on its outer surface merging into tapered or substantially hexagonal side walls 56 angularly disposed outwardly of the strap body sides 20. The side walls 56 terminate in symmetrical imposts 58 on each side of the oblong aperture. The imposts define one longitudinal edge of the oblong aperture, the imposts terminating in interior shoulders 60 parallel to the side 20 of the main body, such that the impost walls 64 form a passageway and support for a tongue passing through the aperture.

Within the oblong aperture, as best seen in FIGS. 1 and 2, the main body 12 of the strap has an extension in the form of pawl 70. Pawl 70 is oF somewhat lesser thickness than the tongue body 12 and is angled generally rectangularly from the tongue body. The joinder of the pawl to the tongue end is essentially radial to lessen stress coplanar with two spaced apart ratchet teeth 75, the upper edge of the uppermost of these teeth forming an edge surface or pawl tip 76.

The body of pawl 70 is separated laterally from the impost walls 60 by lateral spacings 86, with the pawl being connected only to the strap body. The pawl teeth 75 intrude into the aperture 52 within the framed head and may pivot or flex as a strap passes through the aperture 52.

Functionally, the longitudinal depth of aperture 52 is slightly greater than the thickness of the main body to provide clearance for the tongue end of the body to be looped through the head aperture with the body undersurface 40 adjacent the pawl teeth 75. The impost walls 64 tend to guide the main strap body through the aperture and tend to align the strap body with respect to pawl 70. The end wall 54 of the framing member also acts to support and guide the tongue end 22 as it passes through the aperture.

In use, the tongue end 22 is passed through the aperture until the serrated portion has cleared the aperture so that the tongue end serrations may be grasped manually. The tongue end can then be pulled through until the ratchet teeth 42 can mate with pawl teeth 75 and lock the cable strap around the object or objects held within the loop thereof, in generally-known fashion. With the tongue end of the strap body looped through the head, the pawl remains within the area bounded by the imposts and head remote end by a distance greater than one pawl tooth to prevent shearing of a tooth on the tongue which would otherwise engage the pawl teeth. It is understood that such straps are normally tightened by a tensioning tool which pulls the strap through the head to a predetermined or settable tension. The strap is cut and may slide back by a nominal distance on release of the tool applied tension. In the normal usage for which the strap is intended, a bundle of wires will be held within the loop so formed so that the wires may be held tightly against one another in a substantially permanent bundle.

The pawl 70, as shown, comprises an extension of the end of the main strap body 12 with the pawl being tapered or narrower in cross section progressively. The pawl body permits longitudinal flexure and pivotal movement of the pawl as the strap end is threaded therethrough. The pawl body 80 provides the section of least thickness and maximum flexibility in the area just below the lower one of teeth 75. Each tooth has a tapered lower surface and an upper edge substantially normal to the pawl body with the tip end of each tooth being blunted, the blunt tip of the tooth is designed to complement the shape of the strap teeth. The upper tooth 76 is similarly shaped with its upper edge coplanar with the pawl tip. The taper of the pawl tooth lower surface relative to the opposed headwall 91 is typically about 35° to permit passage of the body and proper flexure of the pawl. The lower tooth will typically contact the strap body during passage while the upper tooth 76 will aid in retaining the strap in place once its proper position has been reached. Both teeth remain well within the head at all times, the upper tooth tip 76 being recessed by at least 0.030 to 0.050 inches from the top of the head at all times to prevent accidental cut-off of a working portion of the strap when the strap is tensioned about a bundle of wires and the strap end cut off flush with the head.

The embodiment of FIG. 4 covers a strap 101 which for the most part is identical to the embodiment of FIG. 2. The pawl 102 of FIG. 4 differs from that of FIG. 2 in that there are three pawl teeth 104 within the same vertical extent as the two teeth of FIG. 2. The teeth 104 are shallower in depth than those of FIG. 2, and are regularly spaced within the toothed extent. As can be seen in FIG. 4, the root dimension of each tooth 104 provides a flat area 106 between each tooth, the pawl teeth 104 being suitably blunted to mate accordingly with the strap body teeth.

In FIG. 5, I show a cable tie 111, generally similar to those previously shown, cable tie 111 housing a pawl 112 with four equally spaced teeth 114. Teeth 114 are confined within the same vertical extent as those of the prior embodiment. Each tooth has a blunted tip 116 of short vertical extent and an acutely angled root 118.

In using any of the cable ties shown, the tongue end is looped about a cable tie and threaded through the opening and the end is pushed through the head past the plane of the top of the head. The tongue end is grasped and pulled further through the head. The tongue end may be inserted into a strap tensioning tool and pulled taut with the tool actuated force.

As the tongue end passes the pawl, the lowermost tooth is engaged and is pivoted to further open the head opening. The remote end of the pawl is pivoted out of the way of the passing tongue so that only the lowermost tooth is abraded by the ratcheting of the tongue past the pawl. The remaining teeth being clear of the tongue during its passage, remain relatively unaffected by the tongue.

We have found that by inclining the bottommost tooth at an angle of about 35° relative to the opposite wall 91 of the opening, the inclination of the pawl to allow passage of the tongue is limited to an extent clearly within the bending range of the pawl material without the creation of crack-producing stresses within the pawl pivoting area.

Of course, the distance between the plane through the tips of the teeth and the opposed wall of the head opening is less than the nominal thickness of the tongue so that the pawl teeth will interfere with the free passage of the tongue. The interference may be in the range of 0.006 to 0.010 inches for three or four tooth pawls and slightly greater for the two toothed pawl.

In no event is the interference greater than the thickness of the pawl body behind the teeth, and should be maintained at a comparatively low value so that the pawl is not greatly pivoted on the ratcheting of a strap tongue past the pawl teeth.

What I claim is:

1. A cable strap of unitary construction comprising an elongated body of generally rectangular cross section with an enlarged head connected to one end of said strap, there being a passage through said head adapted to receive the looped remote end of the strap to form a loop for holding objects therein, the invention wherein within said head passage there is an elongated, flexible pawl integrally and curvedly connected to said strap and extending freely into said passage between the sidewalls, the body of said pawl comprising an extension of the strap narrowing in thickness from the thickness of the strap at its pivotal connection thereto, an alignment of ratchet teeth incised into one face of the strap adjacent the remote end of said strap and a first tooth and second tooth on said pawl protruding normally into the passage confronting the end wall of the head and spaced in the path of the looped end of said strap the first of said teeth positioned to cause flexure of said pawl body as the tooth matingly engages said ratchet teeth as the remote end of the strap body is threaded through the passage in said head, the second of said teeth positioned to be moved away from strap remote end during said threading and to restore and hold the strap remote end against the end wall of said head when fully looped through the head.

2. A cable strap as claimed in claim 1, wherein the teeth on the pawl have their tips blunted to mate with like spacings between the ratchet teeth in the strap face.

3. A strap as claimed in claim 1, wherein said pawl has side walls which taper toward convergence adjacent the first of said two teeth.

4. A strap as claimed in claim 1, wherein there is a third tooth on said pawl positioned intermediate between said first and second tooth.

5. A cable strap of unitary construction comprising an elongated body of generally rectangular cross section having ratched teeth with an enlarged head connected to one end of said strap, there being a passage through said head adapted to receive the looped end of the strap to form a loop for holding objects therein, the invention wherein within said head passage there is an elongated, flexible pawl integrally and curvedly connected to said strap and extending freely into said sidewalls, the body of said pawl comprising a smoothly curved concave-convex member of generally decreasing cross section and at least a lower and upper tooth protruding from said pawl body adjacent the free end thereof, said teeth spaced along said passage and spaced from and confronting the end wall of the head, said pawl tapering from its connection to the strap to a narrowed section adjacent the lower of said teeth, said pawl adapted to be flexed by said strap end to remove the upper tooth from contact with said strap end during movement of said strap through said head passage and said lower tooth protrusive from said narrowed section to matingly engage said ratchet teeth as the remote end of the strap body is threaded through the passage, said upper tooth aligned to restore from said flexed position at the termination of movement of said strap through said passage, said upper tooth aligned opposite said end wall to restrain said strap against said end wall to prevent withdrawal of said strap from said passage.

\* \* \* \* \*